(12) United States Patent
Nozaki et al.

(10) Patent No.: US 7,070,421 B2
(45) Date of Patent: Jul. 4, 2006

(54) ROTATING DISK STORAGE DEVICE HAVING CONNECTION STRUCTURE BETWEEN FPC AND PRINTED BOARD

(75) Inventors: Hirofumi Nozaki, Kanagawa (JP); Shinichi Kimura, Kanagawa (JP); Hiroki Kitahori, Kanagawa (JP); Kenji Kuroki, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/009,497

(22) Filed: Dec. 10, 2004

(65) Prior Publication Data

US 2005/0130457 A1   Jun. 16, 2005

(30) Foreign Application Priority Data

Dec. 11, 2003 (JP) ............................. 2003-412945

(51) Int. Cl.
*H01R 12/00* (2006.01)

(52) U.S. Cl. ................ 439/67; 360/264.2; 360/245.8; 360/98.01

(58) Field of Classification Search ................ 439/67, 439/77, 492–499; 360/264.2, 245.8, 98.01, 360/97.01

See application file for complete search history.

(56) References Cited

U.S. PATENT DOCUMENTS

| 4,923,406 | A | * | 5/1990 | Bucknam | 439/77 |
| 5,508,860 | A | * | 4/1996 | Takagi et al. | 360/97.01 |
| 5,541,788 | A | * | 7/1996 | Ishida et al. | 360/98.01 |
| 5,760,997 | A | * | 6/1998 | Koyanagi et al. | 360/97.01 |
| 5,995,322 | A | * | 11/1999 | Yanagihara | 360/97.01 |
| 5,995,365 | A | * | 11/1999 | Broder et al. | 361/685 |
| 6,159,038 | A | * | 12/2000 | Wu | 439/495 |
| 6,246,548 | B1 | * | 6/2001 | Williams | 360/245.8 |
| 6,417,997 | B1 | * | 7/2002 | Williams | 360/245.8 |
| 6,473,263 | B1 | * | 10/2002 | Jang et al. | 360/97.01 |
| 6,529,350 | B1 | * | 3/2003 | Itoh | 360/264.2 |
| 6,540,528 | B1 | * | 4/2003 | Brodsky et al. | 439/67 |
| 6,678,112 | B1 | * | 1/2004 | Kaneko | 360/97.01 |
| 6,722,895 | B1 | * | 4/2004 | Brodsky et al. | 439/67 |
| 6,837,718 | B1 | * | 1/2005 | Brodsky et al. | 439/67 |
| 6,854,982 | B1 | * | 2/2005 | Brodsky et al. | 439/67 |
| 6,867,942 | B1 | * | 3/2005 | Albrecht et al. | 360/69 |

FOREIGN PATENT DOCUMENTS

| JP | 03-056982 | 3/1991 |
| JP | 2000-243076 | 9/2000 |
| JP | 2000-331471 | 11/2000 |

\* cited by examiner

*Primary Examiner*—Gary F. Paumen
(74) *Attorney, Agent, or Firm*—Townsend and Townsend and Crew LLP; Duke Amaniampong

(57) ABSTRACT

Embodiments of the invention provide a rotating disk storage device including a connection structure between an FPC and a printed board and providing allowance for dimensional tolerances. In one embodiment, the rotating disk storage device includes a disk enclosure, an FPC supporting portion, and a flexible printed circuit board assembly provided with an FPC terminal area that extends along a front surface of the FPC supporting portion and further beyond an end portion of the FPC supporting portion. When the printed board is mounted on the disk enclosure, a connector terminal contacts and gives pressure to an FPC terminal formed in the FPC terminal area. This causes the FPC terminal area to flex in the direction of an arrow.

20 Claims, 6 Drawing Sheets

ROTATING DISK STORAGE DEVICE HAVING CONNECTION STRUCTURE BETWEEN FPC AND PRINTED BOARD

CROSS-REFERENCES TO RELATED APPLICATIONS

This application claims priority from Japanese Patent Application No. 2003-412945, filed Dec. 11, 2003, the entire disclosure of which is incorporated herein by reference.

BACKGROUND OF THE INVENTION

The present invention relates generally to a connection structure making an electric connection between a head disk assembly and a printed board in a rotating disk storage device such as a magnetic disk drive, an optical magnetic disk drive, or the like. More particularly, the present invention relates to a connection structure making use of a flexible printed circuit board therefor and a rotating disk storage device adopting the connection structure.

A magnetic disk device generally includes a head disk assembly (hereinafter referred to as the HDA) and a printed board mounted on the HDA. The HDA is constructed so as to hermetically enclose a magnetic disk, a head suspension assembly, an actuator assembly, a spindle motor, an electronic component, and the like in a clean air environment using a disk enclosure. The printed board is mounted with an electronic component controlling an operation of, and data transfer for, the magnetic disk device. A flexible cable is provided inside the disk enclosure for making an electric connection between internal component parts housed in the disk enclosure and the printed board.

The flexible cable, also called a flexible printed circuit board, a flex cable, or the like, is provided with a plurality of conductors sandwiched between flexible sheets, each of the plurality of conductors being insulated from each other. The flexible cable is hereinafter referred to as an FPC (flexible printed circuit) in this specification. The following is described in the abstract of Japanese Patent Laid-Open No. 2000-331471 with reference to FIG. 7. That is, "an end portion 8a of an FPC 8 is extracted to an outside of a housing through an opening 15 provided in a base 2. The FPC 8 is pressed tightly up against a bottom surface 3 of the base 2 by way of double-sided adhesive tape 17. A closure seal 16 is then placed over the FPC 8 to plug the opening 15." In addition, the following is described in that patent document with reference to FIG. 5. That is, "a first end portion 8a of the FPC 8 is extracted to the outside of the housing 1 through the opening 15. A control printed board 1 is mounted on the back of the base 2. The first end portion 8a is connected to a connector 18 mounted on a control printed board 9. This allows signals to be transferred between an inside of the housing 1 and a controller mounted on the control printed circuit 9." FIG. 5 shows a state in which an electric connection is made by the connector 18 that sandwiches the end portion 8a of the FPC.

The following is described in Japanese Patent Laid-Open No. 2000-243076. That is, "in an example shown in FIG. 3, a terminal 4 of a connection portion of a flex cable 3 and a connector 12 shown in FIG. 2 are inserted in a groove portion 2 of a device main body 1 shown in FIG. 1. A terminal 13 of the connector 12 is thereby joined to the terminal 4 of the connection portion of the flex cable 3. At this time, guides 14-1 and 14-2 of the connector 12 are respectively fitted into guide grooves 7-1 and 7-2 of the device main body 1. This correctly positions the terminal 13 of the connector 2 relative to the terminal 4 of the connection portion of the flex cable 3. When the two parts are pressed into an inside of the groove portion 2, a spring of the terminal 13 of the connector 12 causes the terminal 13 of the connector 12 to be pressed against, and joined to, the terminal 4 of the flex cable 3. At this time, tolerances among a width W1 in a short side direction of an opening in the groove portion 2, a width W2 in a short side direction of the connector 12, and a thickness T of the connection portion of the flex cable 3 are controlled so as to fall within a movable range of the spring of the terminal 13 of the connector 12. This maintains a joint between the respective contact points of the terminals 4 and 13."

The method of Japanese Patent Laid-open No. 2000-331471 described above involves the increased number of assembly processes, since it is necessary to sandwich the end portion 8a of the FPC with the connector 18 after the control printed board 7 has been mounted to the housing 1. According to the method of Japanese Patent Laid-open No. 2000-243076 described above, it is necessary to control the mutual dimensional tolerances among the width W1 in the short side direction of the opening in the groove portion 2, the width W2 in the short side direction of the connector 12, and the thickness T of the connection portion of the flex cable 3 so that the tolerances fall within the movable range of the spring of the terminal 13 of the connector 12.

With the recent trend in magnetic disk drives toward an even smaller body, the movable range of the spring of the connector terminal are becoming smaller and smaller. It has therefore become difficult to manufacture magnetic disk drives, while achieving close dimensional tolerances. In the example shown in FIG. 3 of the second patent document described above, there are involved a number of dimensions to be controlled. The dimensions to be controlled include: the width of the groove portion and the position of the groove portion relative to the device main body; the size of the connector and the position of the connector on the circuit board; the position of connection between the device and the circuit board; and the movable range of the spring of the terminal. If any of these dimensions falls outside a predetermined range of dimensional tolerances, a predetermined pressure cannot be obtained, resulting in a contact failure occurring at the terminal.

BRIEF SUMMARY OF THE INVENTION

It is therefore a feature of the present invention to provide a rotating disk storage device having a novel connection structure for connecting electrically an HDA and a printed board. It is another feature of the present invention to provide a rotating disk storage device including a connection structure that allows a positive electric connection to be made between an FPC and a printed board connector by making the FPC pass through a disk enclosure. It is still another feature of the present invention to provide a rotating disk storage device provided with a connection structure between an FPC and a printed board suitable for application to a disk enclosure manufactured through pressworking of stainless steel. It is a further feature of the present invention to provide a rotating disk storage device having a connection structure between an FPC and a printed board and providing allowance for dimensional tolerances.

In accordance with a first aspect of the present invention, there is provided a rotating disk storage device including: a disk enclosure accommodating internal component parts and provided with an opening portion; an FPC supporting portion provided on an edge of the opening portion; a flexible printed circuit board including an FPC terminal area that provides an electric connection with the internal component parts and extends from the opening portion along a front surface of the FPC supporting portion to outside of the disk enclosure; and a printed board provided with a board connector including a connector terminal that comes in contact with an FPC terminal formed in the FPC terminal area when mounted on the disk enclosure. The FPC terminal area is provided with a restrained area that comes in contact with the FPC supporting portion and a free area that is elastically flexed by the connection between the connector terminal and the FPC terminal.

In some embodiments, the FPC terminal area is extracted from the opening portion onto the outside of the disk enclosure and achieves an electric connection as the FPC terminal comes in contact with the connector terminal. The FPC terminal area is provided with the free area that is elastically flexed upon contact with the connector terminal. The free area has adequate stiffness and elasticity and can be provided at a leading end portion of the FPC terminal area. The FPC is generally highly flexible. If the FPC lacks in stiffness and elasticity required for achieving the present invention, a reinforcement plate may be provided for the FPC terminal area for reinforcement. Alternatively, the FPC itself may be formed in the FPC terminal area so as to maintain elasticity and enhance stiffness.

The FPC supporting portion may be made of a material different from that of the disk enclosure, being fixed in position with an adhesive or the like. The FPC supporting portion may still be formed integrally with the disk enclosure. To form the FPC supporting portion integrally with the disk enclosure, the FPC supporting portion is formed by subjecting a sheet metal to press working or by aluminum die casting. If a sheet metal is subjected to press working, part of the disk enclosure is cut at the position of the opening portion and the cut portion is bent outwardly to form the FPC supporting portion.

In specific embodiments, a groove to which the board connector is fitted may be provided on an outer periphery of the opening portion. It is thereby possible to bring a gap between the board connector and the FPC terminal within required dimensional tolerances. If the disk enclosure is formed by subjecting a sheet metal to press working, part of the area cut for forming the opening portion may be bent outwardly to form the groove for the board connector.

In accordance with a second aspect of the present invention, there is provided a rotating disk storage device including: a disk enclosure accommodating internal component parts and provided with an opening portion; an FPC supporting portion provided on an edge of the opening portion; a flexible printed circuit board including an FPC terminal area that provides an electric connection with the internal component parts and extends from the opening portion along a front surface and over an end portion of the FPC supporting portion on the outside of the disk enclosure; and a printed board provided with a board connector including a connector terminal that comes in contact with an FPC terminal formed in the FPC terminal area when mounted on the disk enclosure.

In accordance with a third aspect of the present invention, there is provided a rotating disk storage device including: a disk enclosure accommodating internal component parts and provided with an opening portion; a flexible printed circuit board including an FPC terminal area that provides an electric connection with the internal component parts and extends past the opening portion and along an outer front surface of the disk enclosure; and a printed board provided with a board connector including a connector terminal that comes in contact with an FPC terminal formed in the FPC terminal area when mounted on the disk enclosure.

In accordance with the embodiments of the present invention, it is possible to provide a rotating disk storage device having a novel structure for electrically connecting the HDA and the printed board. Further, it is possible to provide a rotating disk storage device having a connection structure that allows a positive electric connection to be made between the FPC and the printed board connector by making the FPC pass through the disk enclosure. In addition, it is possible to provide a rotating disk storage device having a connection structure between the FPC and the printed board suitable for application to the disk enclosure manufactured through pressworking of the stainless steel. Further, it is possible to provide a rotating disk storage device having a connection structure between the FPC and the printed board and providing allowance for dimensional tolerances.

DETAILED DESCRIPTION OF THE INVENTION

Figure 1:
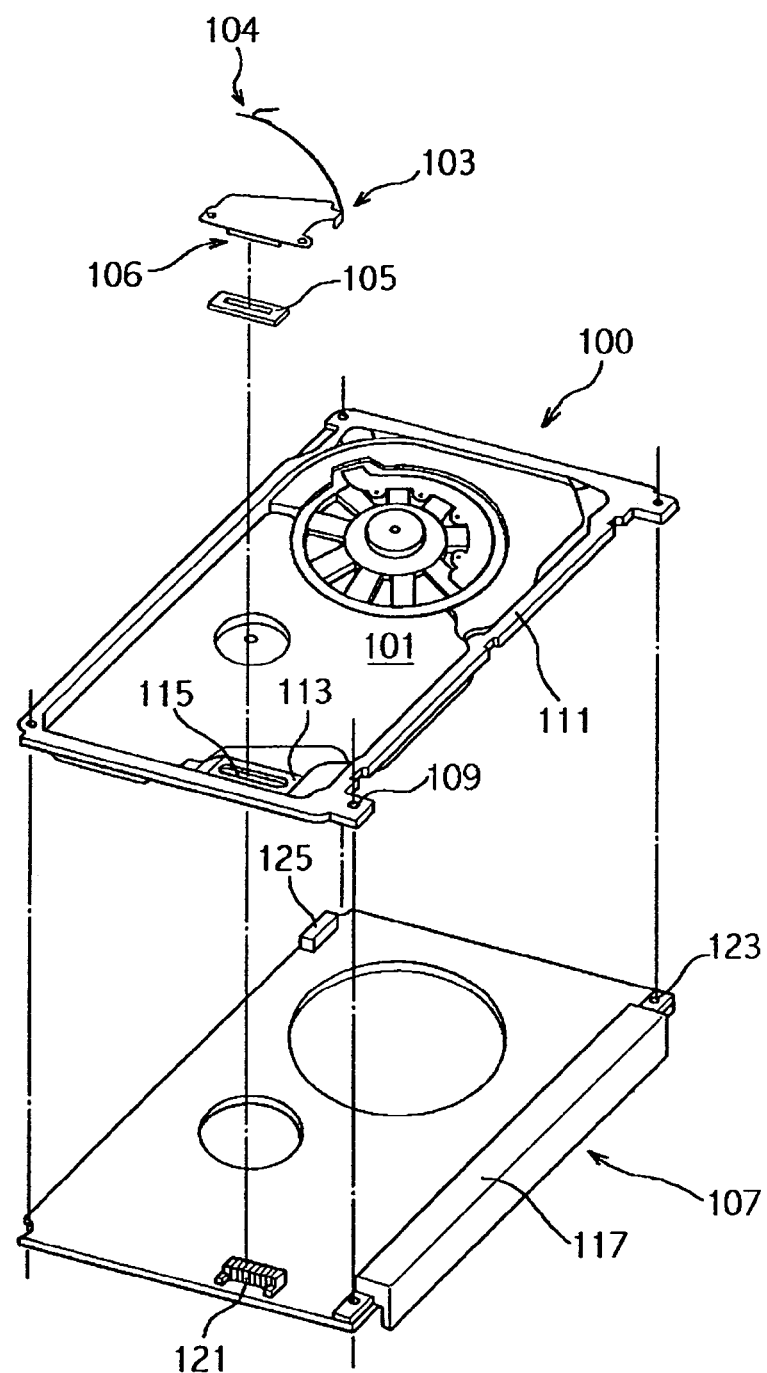
FIG. 1 is a perspective view showing a state of assembling an FPC assembly and a printed board to a disk enclosure of a magnetic disk device 100 according to an embodiment of the present invention.
Figure 2:
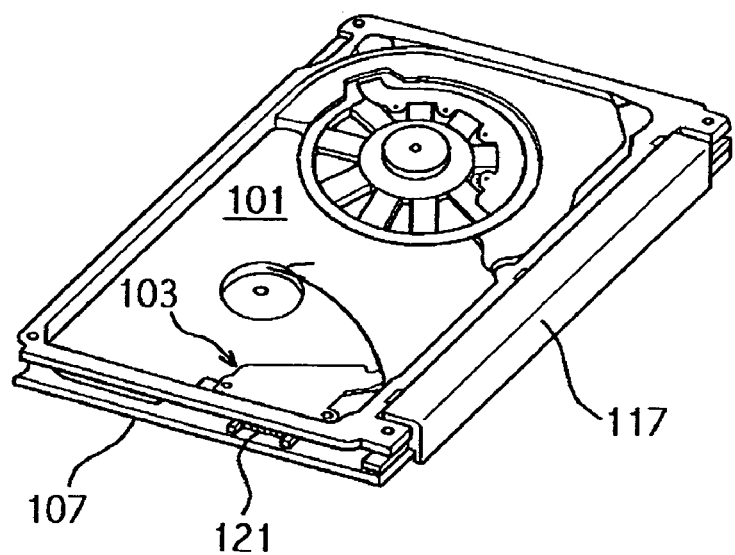
FIG. 2 is a perspective view showing an assembled state of the FPC assembly and the printed board shown in FIG. 1.

FIG. 1 is a perspective view showing a state of assembling an FPC assembly 103 and a printed board 107 to a disk enclosure 101, which forms part of a magnetic disk drive 100 according to an embodiment of the present invention. FIG. 2 is a perspective view showing an assembled state of the same. Like reference numerals are used throughout the entire specification and all figures to denote like parts. A lid (not shown) is attached onto a flange portion 111 of the disk enclosure 101 that serves as a base for the magnetic disk drive 100. The lid thereby covers the entire body of the disk enclosure 101 so as to define a hermetic space therein. The disk drive 100 thus prevents entry of dust and dirt from the outside to provide a clean air environment inside the disk enclosure 101.

The disk enclosure 101 accommodates therein the following internal component parts. The parts include a magnetic disk as a storage medium; a spindle hub and a spindle motor, which rotatably support the magnetic disk; a head reading and/or writing data from and/or to the magnetic disk; an actuator suspension assembly mounted with the head so as to allow the head to access the magnetic disk; a voice coil motor driving the actuator suspension assembly; and electronic devices associated with transfer of data for the head. Each of these internal component parts is well known and, for simplifying the drawings, omitted in FIGS. 1 and 2. The constituent parts of the magnetic disk drive, which are internal component parts accommodated in the disk enclosure 101 and hermetically closed by the lid, are called the HDA.

The printed board 107 includes a wiring pattern that is formed with electronic devices mounted thereon by an etching process. These electronic devices control the operation of the internal component parts included in the HDA and transfer of data for a host computer. Threaded holes 123 provided at four corners of the printed board 107 are respectively aligned with threaded holes 109 provided at four corners of the disk enclosure 101. The printed board 107 is then screwed at the outside of the disk enclosure 101. Securing the printed board 107 to the HAD completes the assembly of the magnetic disk drive.

The printed board 107 includes a board connector 121 connected to the FPC assembly 103; an interface connector 117 connected to the host computer; and a spindle connector 125 connected to a power source circuit of the spindle motor. One terminal portion 104 of the FPC assembly 103 is mechanically secured to the actuator assembly housed in the disk enclosure 101 and electrically connected to the head and a voice coil. A shock sensor, a temperature sensor, or the like may be mounted at the point midway to the FPC assembly. In accordance with the embodiment of the present invention, electronic devices to be described with reference to FIGS. 3A, 3B, and 3C are mounted.

The other terminal portion 106 of the FPC assembly 103 is connected to the board connector 121 through an opening portion 115 formed in an FPC assembly fixing portion 113. According to the embodiment of the present invention, the other terminal portion 106 of the FPC assembly 103 is provided with an FPC terminal area 143 as will be described with reference to FIGS. 3A, 3B, and 3C. The FPC assembly 103 is secured to the FPC assembly fixing portion 113 formed inside the disk enclosure 101. A gasket 105 is sandwiched between the FPC assembly fixing portion 113 and the FPC assembly 103. This provides airtightness preventing dust and dirt from entering into the inside of the HDA through the opening portion 115.

Figure 3:
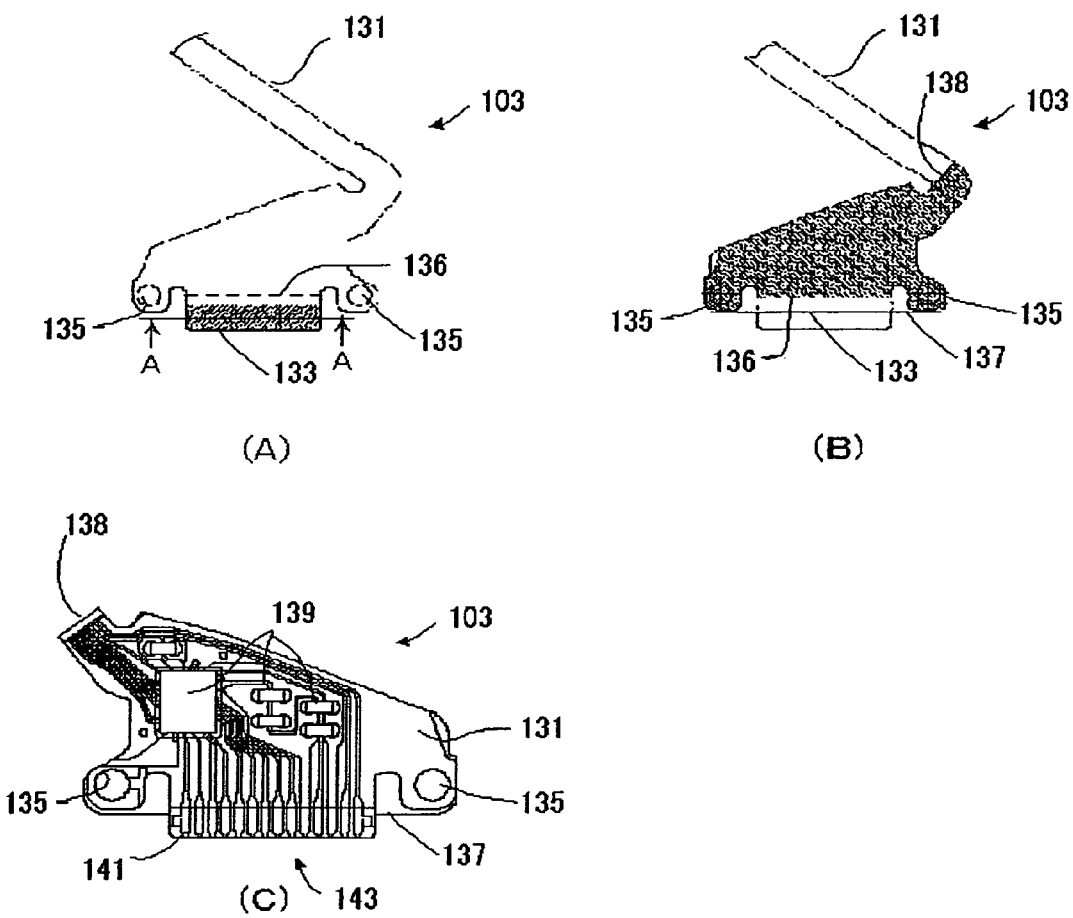
FIGS. 3A, 3B, and 3C are plan views showing the FPC assembly according to the embodiment of the present invention.
Figure 4:
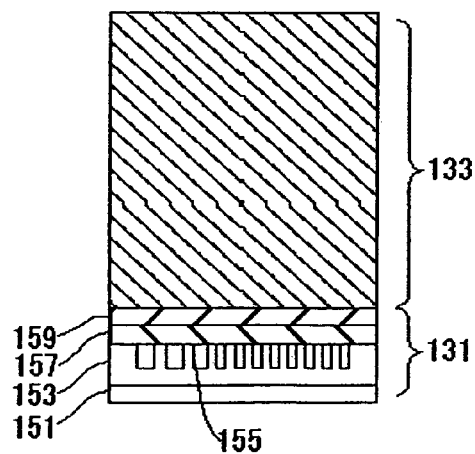
FIG. 4 is a cross-sectional view showing the FPC assembly according to the embodiment of the present invention.

FIGS. 3A, 3B, and 3C are plan views showing part of the FPC assembly 103 including a plurality of parts. The FPC assembly 103 includes an FPC 131, a reinforcement plate 133, and a reinforcement plate 137. FIG. 3A is a plan view showing part of the FPC 131 and the reinforcement plate 133 provided in an area drawn with a meshed pattern. FIG. 4 is a cross-sectional view taken along line A—A in FIG. 3A. The FPC 131 and the reinforcement plate 133 will be described with reference to FIG. 4. The FPC 131 includes a cover film layer 151 formed from polyimide, an adhesive layer 153, a conductive layer 155 formed as a plurality of conductive patterns, an adhesive layer 157, and a base film layer 159 formed from polyimide. The FPC 131 has an overall thickness of 70 □m. The reinforcement plate 133 provided in the area drawn with the meshed pattern in FIG. 3A is formed from a 230-□m-thick polyimide film. The FPC 131 is formed as follows: the base film layer 159, the adhesive layer 157, and the conductive layer 155 are formed using a well-known etching process; the adhesive layer 153 is applied thereto; and the separately formed cover film layer 151 is affixed to the adhesive layer 153. The FPC 131 may be manufactured using any well-known technique, in addition to that used in this embodiment.

The reinforcement plate 133 is affixed to the base film layer 159 of the FPC 131 with an adhesive. The cover film layer 151 and adhesive layer 153 of the FPC 131 are removed near a portion to which the reinforcement plate 133 is affixed as shown in FIG. 3C. This is done to use the conductive layer 155 as an FPC terminal 141. The reinforcement plate 133 is provided to add stiffness to the FPC 131, thereby providing elasticity against a bending load. Referring to FIGS. 3A and 3B, threaded holes 135 are formed in the FPC 131 and the reinforcement plate 137. This allows the FPC 131 and the reinforcement plate 137 to be screwed to the FPC assembly fixing portion 113.

FIG. 3B shows a state in which the reinforcement plate 137 made of stainless steel is affixed onto the FPC 131. A portion drawn with a meshed pattern represents an area in which the reinforcement plate 137 and the FPC 131 are bonded together. The reinforcement plate 137 is substantially aligned with the FPC 131 on the periphery thereof. No reinforcement plate 137 exists in a narrow portion beyond a boundary the reinforcement plate 137 has at an end portion 138 thereof. The reinforcement plate 133 is not bonded to the reinforcement plate 137. When the FPC assembly 103 is to be secured to the FPC assembly fixing portion 113, the reinforcement plate 133 can be bent into a mountain fold at a bend 136. The reinforcement plate 137 gives stiffness to the FPC 131 for mounting thereon electronic devices and presses the gasket 105 to achieve a seal.

FIG. 3C is a plan view showing the back of FIG. 3B. FIG. 3C shows electronic devices 139, the FPC terminal 141, and a wiring pattern mounted on the cover film layer 151. In FIG. 3C, the wiring pattern of the conductive layer 155 is drawn to cover an entire area in order to simplify the drawing. It is needed, however, only to remove the cover film layer 151 at a portion in which the FPC terminal is formed, and at a portion in which the electronic devices are connected to the wiring pattern. In the FPC assembly 103, the area in which the reinforcement plate 133 is provided is called the FPC terminal area 143. In addition, an example, in which no reinforcement plates are provided, will also be given in accordance with the embodiment of the present invention, as will be described later. In this case, an area of the FPC 131 corresponding to the area of the reinforcement plate 133 is called the FPC terminal area 143.

Figure 5:
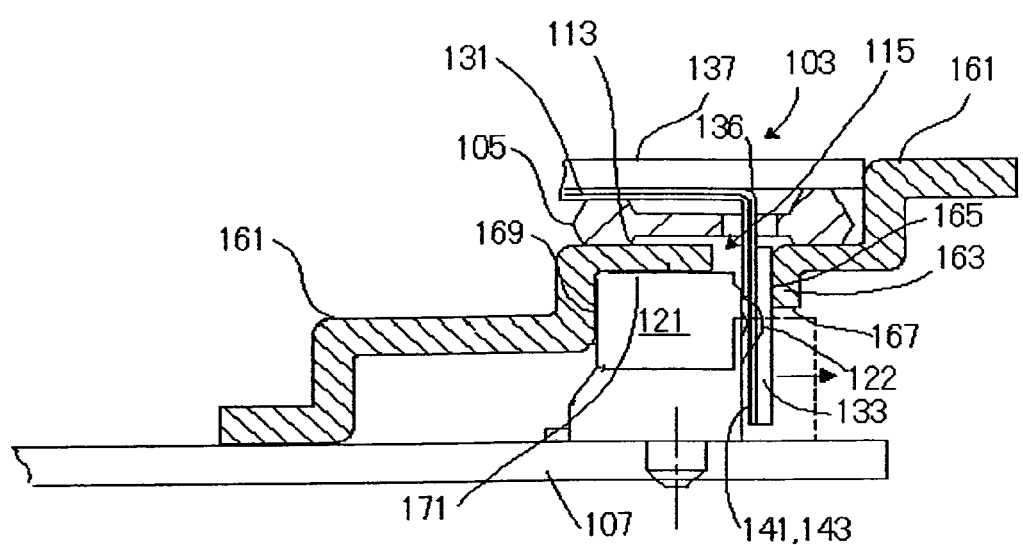
FIG. 5 is a cross-sectional view showing a connection structure with a printed board mounted to a disk enclosure.

FIG. 5 is a cross-sectional view showing an area near the FPC assembly fixing portion 113 of the magnetic disk device 100 shown in FIG. 2. To simplify the drawing, single cross-hatching is applied only to an enclosure plate 161. The disk enclosure 101 shown in FIG. 2 is formed by press-working a stainless steel plate. The enclosure plate 161 forms a bottom portion of the disk enclosure 101. An FPC supporting portion 163 is formed with the opening portion 115 in the FPC assembly fixing portion 113 forming part of the enclosure plate 161. The portion 163 is formed by cutting one longer side and two shorter sides of the four sides of a rectangle and bending the remaining longer side portion outward the disk enclosure 101. The FPC supporting portion 163 is provided with an FPC terminal area contact surface 165 making contact with an FPC terminal area 143 that continues from a surface on an edge of the opening portion 115 and extends outward the enclosure plate from the edge of the opening portion 115. As long as the FPC supporting portion is provided with the FPC terminal area contact surface, the FPC supporting portion may be manufactured using a material different from that of the disk enclosure and formed by attaching to the edge of the opening portion. Further, the opening portion 115 may be formed so that the edge of the opening portion 115 in contact with the reinforcement plate 133 approaches a side of a connector terminal 122. Thus, the edge of the opening portion 115 may be arranged to play the role of the FPC supporting portion 163, instead of bending the FPC supporting portion 163 as shown in FIG. 5 or manufacturing the same using a different material.

The FPC assembly 103 is secured to the FPC assembly fixing portion 113 using the threaded holes 135, with the gasket 105 interposed therebetween. The FPC 131 bonded to the stainless steel reinforcement plate 137 in the FPC assembly 103 bends at the bend 136 to depart from the reinforcement plate 137, passes through the gasket 105 and the opening portion 115, and extends outwardly from an inside of the enclosure plate 161. The reinforcement plate 133 extends outwardly, keeping in contact with the FPC terminal area contact surface 165 of the FPC supporting portion 163. The FPC terminal area 143, on the other hand, extends further beyond an end portion 167 of the FPC supporting portion 163. The portion of the FPC terminal area 143 extending beyond the end portion 167 of the FPC supporting portion 163 can flex in the direction of the arrow when receiving a force exerted from the connector terminal 122.

The printed board 107 is provided with the board connector 121. The board connector 121 is provided with the connector terminal 122. The connector terminal 122 slightly protrudes toward a front (to the right in FIG. 5) from a main body portion of the board connector 121. The connector terminal 122 adopts a spring structure exhibiting elasticity when pressed from the front (from the right direction in FIG. 5). This ensures positive contact with the FPC terminal 141. A surface, opposite to the connector terminal 122, of the board connector 121 is in contact with an outer surface 169 of the enclosure plate 161. This allows a gap between the board connector 121 and the FPC terminal area 143 to be brought into a predetermined range of dimensional tolerances. Specifically, positive contact is achieved between the FPC terminal 141 and the connector terminal 122 by fitting the board connector 121 into a groove formed between the outer surface 169 and the FPC terminal area 143.

Figure 6:
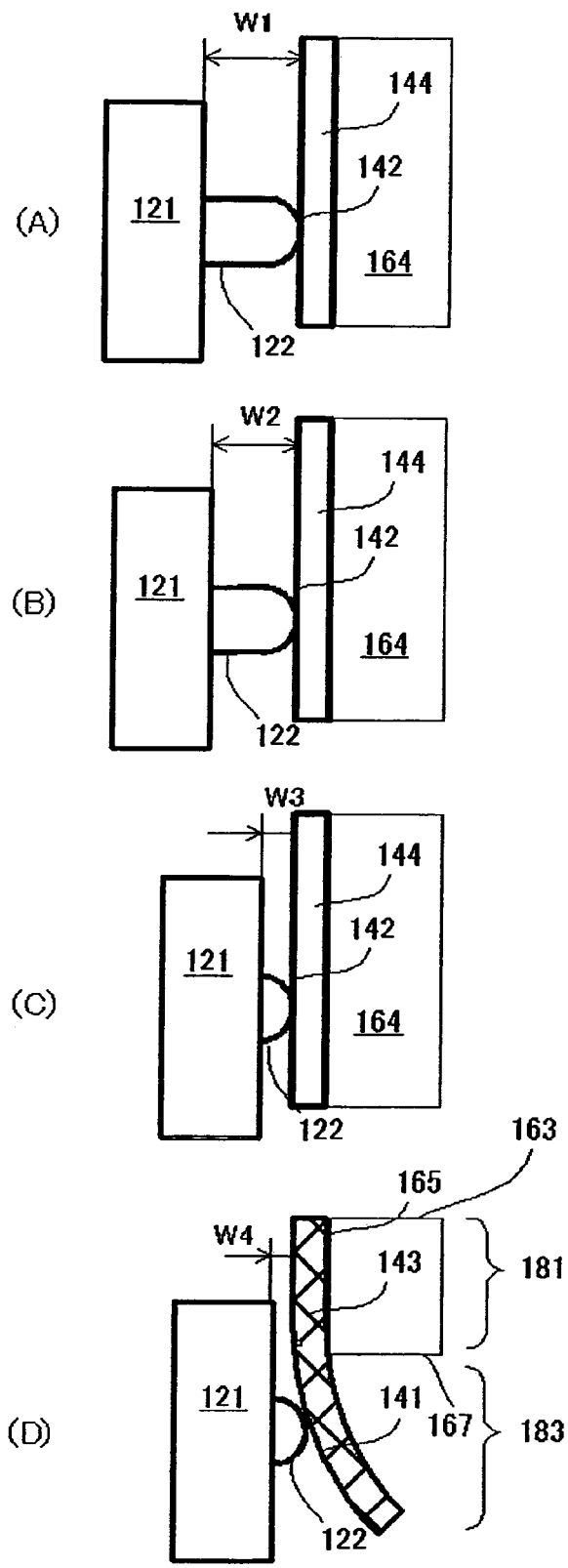
FIGS. 6A, 6B, 6C, and 6D are schematic views showing a relationship between a condition of contact between a connector terminal and an FPC terminal, and dimensional tolerances therefor.

The principle involved with the embodiment of the present invention allowing the dimensional tolerances set for providing the positive contact between the board connector 121 and the FPC terminal 141 provided in the FPC terminal area 144 to be made larger will be explained with reference to FIGS. 6A through 6D. FIGS. 6A through 6D are diagrams for explaining the relationship between the board connector 121 and the FPC terminal area 143 or 144, together with the structure of the FPC supporting portion 163 or 164. FIGS. 6A through 6C represent a conventional connection structure, while FIG. 6D represents the connection structure according to the embodiment of the present invention shown in FIG. 5.

Referring to FIGS. 6A through 6D, the connector terminal 122 incorporates the well-known spring structure as detailed in the following. Specifically, the connector terminal 122 exhibits elasticity, while retracting into the main body of board connector 121 as the connector terminal 122 contacts the FPC terminal 141 or 142 and receives a force from a contacting surface. The spring structure of the connector terminal 122 may take different forms as long as the form exhibits elasticity to produce a predetermined pressure on receipt of a pressure from a mating part of contact. The spring structure may be one having a loop shape to exhibit elasticity as the loop is deformed. The structure may even be a cantilever exhibiting elasticity, or a type making use of a spring.

When the printed board is mounted to the disk enclosure, it is necessary that the connector terminal 122 should come into contact with the FPC terminal 141 or 142 and achieve a predetermined pressure. To implement this, it is necessary to establish predetermined dimensional tolerances for a gap between the board connector 121 and the contacting surface of the FPC terminal 141 or 142. In FIG. 6A, a gap between the board connector 121 and the contacting surface of the FPC terminal 142 is W1. FIG. 6A shows a state in which a leading end portion of the connector terminal 122 has just come in contact with the FPC terminal 142, exerting no pressure. It is virtually impossible to obtain a stabilized connector connection in this state. It is therefore necessary to set the gap between the board connector 121 and the FPC terminal 142 to a value slightly narrower than the current one, W2 (W2<W1). FIG. 6B shows this condition. In FIG. 6B, the board connector 121 approaches the FPC terminal 142. While exhibiting elasticity, the connector terminal 122 retracts into the inside of the board connector 121 to produce the predetermined pressure. W2 represents the maximum value of the dimensional tolerances between the board connector 121 and the FPC terminal 142.

A range in which the connector terminal 122 exhibits elasticity has a limit. In FIG. 6C, when the gap between the board connector 121 and the FPC terminal 142 becomes W3 (W3<W2), the connector terminal 122 becomes unable to retract into the main body of the board connector 121 any more. An even greater force, if applied, destroys the connector terminal 122. W3 represents the minimum value of the dimensional tolerances between the board connector 121 and the FPC terminal 142. In the conventional structure shown in FIGS. 6A through 6C, the FPC terminal area 144, which is in contact with the FPC supporting portion 164 throughout an entire area thereof, cannot move toward a side of the FPC supporting portion 164. It is therefore necessary to set an upper limit of dimensional tolerances between the board connector 121 and the FPC terminal 142 to W2 and a lower limit thereof to W3. The range between W2 and W3 corresponds to a stroke or a movable range of the connector terminal 122.

FIG. 6D shows a state in which the FPC supporting portion 163 is not in contact with the leading end portion of the FPC terminal area 143. FIG. 6D further shows a state in which a leading end portion of the FPC terminal area 143 is flexed by a pressure received from the connector terminal 122. An area of the FPC terminal area 143 in contact with the FPC terminal area contact surface 165 of the FPC supporting portion 163 is called a restrained area 181. An area of the FPC terminal area 143 extending beyond the end portion 167 of the FPC supporting portion 163 and being flexible on receipt of a pressure from the connector terminal 122 is called a free area 183.

Since stiffness has been enhanced by bonding the reinforcement plate 133 to the FPC 131, the FPC terminal area 143 can elastically warp or flex even if the gap between the board connector 121 and the FPC terminal 141 is W4 (W4<W3). This provides W3 representing a length required for the connector terminal 122 to protrude a minimum amount from the main body of the board connector 121, eliminating the possibility of the FPC terminal area 143 damaging the connector terminal 122. Even if the gap between the board connector 121 and the FPC terminal 141 is W2, the stiffness given to the FPC terminal area by the reinforcement plate 133 allows the connector terminal 122 to exert the predetermined pressure. To state it another way, the FPC terminal area 143 including the reinforcement plate 133 is to be selected so as to be provided with the stiffness and elasticity as described in the following. Specifically, the FPC terminal area 143 including the reinforcement plate 133 has such stiffness as to give the FPC terminal 141 the predetermined pressure when the gap is W2. Meanwhile, the FPC terminal area 143 including the reinforcement plate 133 is elastic in such a manner that the FPC terminal area 143 does not damage the connector terminal 122 and is restored to its original position when the gap is W4.

As evident from the descriptions in the foregoing, in the example shown in FIG. 6D, it is possible to set the dimensional tolerances of the gap between the board connector 121 and the FPC terminal 141 to a range from W2 to W4. This allows the gap to be made to a range larger than that in the conventional structure shown in FIG. 6A. This in turn helps make it easier to manufacture the connector-to-FPC connection structure when the trend is now toward more and more compact magnetic disk drives, making the connector terminal stroke smaller and smaller and making it more and more difficult to keep dimensions of the HDA component parts under control. The polyimide film is not the only material to be used for the reinforcement plate 133. A metal sheet such as stainless steel or the like, or a synthetic resin film or the like, may be used as long as a thickness is selected to ensure adequate stiffness and elasticity. In addition, instead of providing the reinforcement plate 133, the etching process is used to form the FPC terminal area only of the entire FPC to have such a thick wall as to offer predetermined stiffness and elasticity. When the magnetic disk device is made even more compact, it may be possible to narrow the width of the FPC terminal area or change the shape of the FPC terminal area, without forming the FPC terminal area to have a thick wall. A material having high stiffness may even be used for the FPC. The FPC terminal area can thus be formed to have sufficient stiffness.

Referring to FIG. 5, the FPC supporting portion 163 is formed by making use of the cut and bent portion for forming the opening portion 115 in the enclosure plate 161. The FPC supporting portion 163 according to the embodiment of the present invention has the end portion 167 that does not extend up to the leading end portion of the FPC terminal area 143. The FPC supporting portion 163 may be short. This means that the width of the opening portion 115 shown in FIG. 5 may be narrow. It is therefore possible to make small the width of the opening portion 115 and the FPC assembly fixing portion 113. This follows that the outer surface 169 of the enclosure plate can be brought nearer to the side of the FPC terminal 141 in accordance with the outline of the board connector 121. This expands, inside the disk enclosure, the space for disposing the electronic devices 139 described in FIG. 3C. The end portion 167 of the FPC supporting portion 163 is provided at a location closer to the disk enclosure than the position of contact between the connector terminal 122 and the FPC terminal 141. This allows the free area to be formed in the FPC terminal area 143 and the space inside the disk enclosure to be enlarged. Further, making the opening portion 115 smaller allows the gasket to be made more compact, thus enhancing airtightness.

Figure 7:
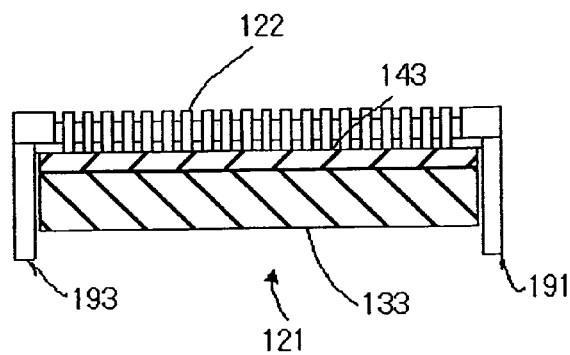
FIG. 7 is a plan view showing a state in which the FPC terminal comes in contact with the connector terminal of the printed board.

FIG. 7 is a view showing the FPC terminal area 143 in contact with the board connector 121 as viewed from above. Guides 191 and 193 are provided on both ends of the board connector 121 in a longitudinal direction. The FPC terminal area 143 and the connector terminal 122 are thereby aligned properly in the longitudinal direction.

Figure 8:
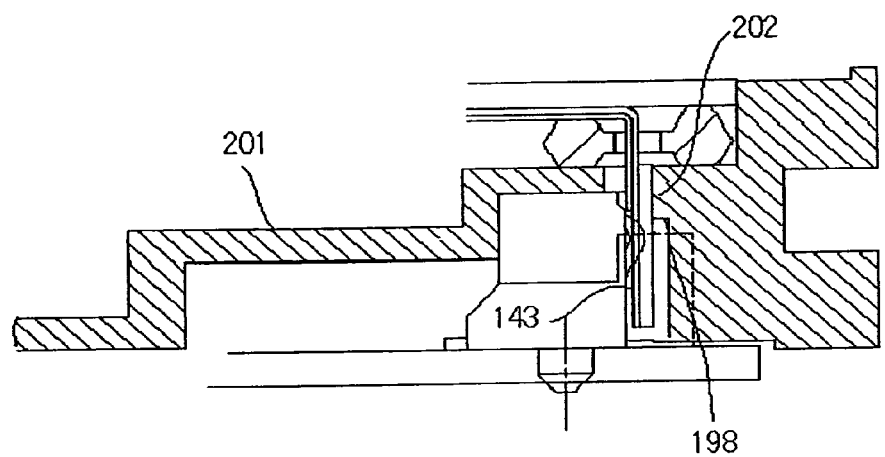
FIG. 8 is a cross-sectional view showing another example of connection structure, in which the printed board is mounted to the disk enclosure.

FIG. 8 is a view showing a construction according to another embodiment of the present invention. In accordance with the construction shown in FIG. 8, a disk enclosure 201 is manufactured through aluminum die casting and machining. An FPC supporting portion 202 is also formed integrally with the disk enclosure 201. An end portion 198 of the FPC supporting portion 202 is provided midway in the FPC terminal area 143 in the same manner as the embodiment shown in FIG. 5. The end portion 198 thus provides the FPC terminal area 143 with a free area.

Figure 9:
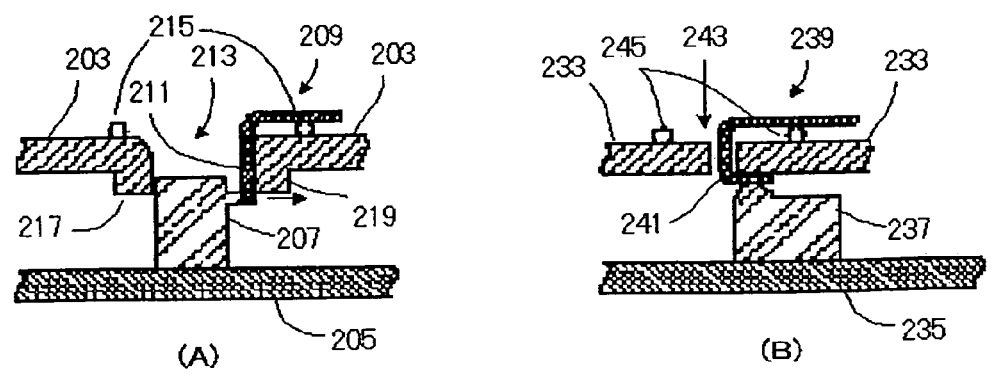
FIG. 9 is a cross-sectional view showing still another example of connection structure, in which the printed board is mounted to the disk enclosure.

FIGS. 9A and 9B are views showing a connection structure between the HDA and the printed board according to still another embodiment of the present invention. Referring to FIG. 9A, an opening portion 213 is formed in an enclosure plate 203 formed from a stainless steel sheet through pressworking. To form the opening portion 213, part of the enclosure plate 203 is cut into an H-shape and bends 217 and 219 are formed from that part of the enclosure plate 203 forming the opening portion 213. A board connector 207 mounted on a printed board 205 is fitted to the bend 217. This position of the board connector 207 is used as reference for defining a position thereof relative to an FPC terminal area 211. The bend 219 corresponds to the FPC supporting portion 163 shown in FIG. 5. An FPC assembly 209 extends over a gasket 215 up to the opening portion 213. The FPC assembly 209 then bends downward at an edge of the opening portion 213. A reinforcement plate (not shown) corresponding to the reinforcement plate 137 shown in FIG. 5 and the gasket 215 work together to seal the opening portion 213. The FPC terminal area 211 extends further downward from an end portion of the bend 219. A leading end portion of the FPC terminal area 211 forms a free area.

When the board connector 207 is inserted in a groove formed between a front surface of the bend 217 and the FPC terminal area 211 in the opening portion 213, a connector terminal of the board connector 207 comes in contact with an FPC terminal elastically so as to maintain a predetermined pressure. Similarly as described with reference to FIGS. 6A through 6D, owing to functioning of the free area formed by the leading end side of the FPC terminal area 211, dimensional tolerances for the gap between the board connector 207 and the FPC terminal area 211 can be made larger. In addition, according to the embodiment as shown in FIG. 9A, it is possible to form a structure defining the position of the board connector 207 by means of the bend 217 and the FPC terminal area 211 in contact with the bend 219 more easily as compared with the embodiment shown in FIG. 5.

In each of the embodiments of the present invention as described with reference to FIGS. 5, 8, and 9A heretofore, the restrained area and the free area are provided for the FPC terminal area to increase dimensional tolerances. FIG. 9B shows another connection structure in which no free area is provided for the FPC terminal area. An opening portion 243 is formed in an enclosure plate 233 formed from a stainless steel sheet through pressworking. Unlike the embodiment shown in FIG. 9A, however, no bends are formed on an edge of the opening portion 243. A gasket 245 is placed on an inner surface of the enclosure plate 233. An FPC assembly 239 is placed over the gasket 245 and extends through the opening portion 243 up to an outer surface of the enclosure plate 233. A reinforcement plate (not shown) corresponding to the reinforcement plate 137 shown in FIG. 5 and the gasket 245 work together to seal the opening portion 243.

A surface opposite to an FPC terminal of an FPC terminal area 241 is in contact with, and secured using an adhesive or the like to, the outer surface of the enclosure plate 233. A connector terminal of a board connector 237 mounted on a printed board 235 is a spring type. When the printed board 235 is mounted on the HDA, the connector terminal presses the FPC terminal from the underside of the enclosure plate 233, providing a required pressure. According to this embodiment, it is not necessary to give the FPC terminal area stiffness and elasticity required for functioning as a free area. It is, however, necessary to provide a mechanism for aligning respective positions of the enclosure plate 233 and the board connector 237. This can be achieved by, for example, providing the enclosure plate 233 with a guide for the printed board 235 or the board connector 237. In any of the connection structures between the HDA and the printed board according to the embodiments of the present invention described heretofore, an electric connection can be established by simply mounting the printed board on the HDA. This is advantageous in terms of manufacturing processes.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A rotating disk storage device, comprising:
   a disk enclosure accommodating internal component parts and provided with an opening portion;
   an FPC supporting portion provided on an edge of said opening portion;
   a flexible printed circuit board including an FPC terminal area that provides an electric connection with said internal component parts and extends from said opening portion along a front surface of said FPC supporting portion to outside said disk enclosure; and
   a printed board provided with a board connector including a connector terminal that comes in contact with an FPC terminal formed in said FPC terminal area when mounted on said disk enclosure;
   wherein said FPC terminal area includes a restrained area that comes in contact with said FPC supporting portion and a free area that is configured to be elastically flexed by the contact between said connector terminal and said FPC terminal.

2. The rotating disk storage device according to claim 1, wherein said flexible printed circuit board comprises a reinforcement plate at said FPC terminal area.

3. The rotating disk storage device according to claim 2, wherein said reinforcement plate comprises a polyimide film or a stainless steel sheet.

4. The rotating disk storage device according to claim 1, wherein said FPC supporting portion is formed integrally with said disk enclosure.

5. The rotating disk storage device according to claim 1, wherein said FPC supporting portion is manufactured as an independent part separate from said disk enclosure and secured to a position outside the opening portion in said disk enclosure.

6. The rotating disk storage device according to claim 1, wherein said disk enclosure includes a groove, in which said board connector fits, in an outer periphery of said opening portion.

7. The rotating disk storage device according to claim 1, wherein said disk enclosure is formed by subjecting a sheet metal to press working and said FPC supporting portion is formed by cutting part of said disk enclosure at a position of said opening portion and bending the cut portion outwardly.

8. The rotating disk storage device according to claim 1, wherein said free area is provided at a leading end portion of said FPC terminal area.

9. A rotating disk storage device, comprising:
   a disk enclosure accommodating internal component parts and provided with an opening portion;
   an FPC supporting portion provided on an edge of said opening portion;
   a flexible printed circuit board including an FPC terminal area that provides an electric connection with said internal component parts and extends from said opening portion along a front surface of said FPC supporting portion and over an end portion of said FPC supporting portion to outside said disk enclosure; and
   a printed board provided with a board connector including a connector terminal that comes in contact with an FPC terminal formed in said FPC terminal area when mounted on said disk enclosure.

10. The rotating disk storage device according to claim 9, wherein the end portion of said FPC supporting portion is located at a portion closer to said disk enclosure than the position of contact between said connector terminal and said FPC terminal.

11. The rotating disk storage device according to claim 9, wherein said connector terminal exhibits elasticity caused by pressure received from said FPC terminal.

12. The rotating disk storage device according to claim 9, wherein said flexible printed circuit board comprises a reinforcement plate at said FPC terminal area.

13. The rotating disk storage device according to claim 9, wherein said disk enclosure is formed by subjecting a sheet metal to press working and said FPC supporting portion is formed by cutting part of said disk enclosure at the position of said opening portion and bending the cut portion outwardly.

14. The rotating disk storage device according to claim 13, wherein a bend is formed so as to oppose said FPC supporting portion by cutting part of said disk enclosure at the position of said opening portion and bending outwardly and said board connector is fitted between said FPC terminal area and said bend.

15. The rotating disk storage device according to claim 9, wherein the FPC terminal area of said flexible printed circuit board is formed to offer stiffness higher than other areas of said flexible printed circuit board.

16. A rotating disk storage device, comprising:
   a disk enclosure accommodating internal component parts and provided with an opening portion;
   a flexible printed circuit board including an FPC terminal area that provides an electric connection with said internal component parts and that runs past said opening portion, bends, and extends along an outer front surface of said disk enclosure; and
   a printed board provided with a board connector including a connector terminal that comes in contact with an FPC terminal formed in said FPC terminal area when mounted on said disk enclosure,
   wherein said FPC terminal is formed in a portion of said FPC terminal area that runs past said opening portion, bends, and extends along the outer front surface of said disk enclosure, and that is configured to be elastically flexed by the contact between said connector terminal and said FPC terminal.

17. The rotating disk storage device according to claim 16, wherein a gasket is provided around said opening portion.

18. The rotating disk storage device according to claim 16, wherein the FPC terminal area extends over the gasket and through the opening portion of the disk enclosure with no free area that is elastically flexed.

19. The rotating disk storage device according to claim 16, wherein the disk enclosure includes an FPC supporting portion on an edge of the opening portion, where the FPC terminal area includes a restrained area that comes in contact with the FPC supporting portion and a free area that is configured to be elastically flexed by the contact between the connector terminal and the FPC terminal.

20. The rotating disk storage device according to claim 16, wherein the flexible printed circuit board comprises a reinforcement plate at the FPC terminal area.

* * * * *